United States Patent
Kim et al.

(10) Patent No.: US 9,825,749 B2
(45) Date of Patent: Nov. 21, 2017

(54) SYSTEM, METHOD AND APPARATUS FOR CONNECTING ACCESS POINT

(71) Applicant: Samsung Electronics Co., Ltd., Gyeonggi-do (KR)

(72) Inventors: Changsik Kim, Gyeonggi-do (KR); Suckho Seo, Gyeonggi-do (KR); Jiryang Chung, Gyeonggi-do (KR); Inhyup Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 234 days.

(21) Appl. No.: 14/665,778

(22) Filed: Mar. 23, 2015

(65) Prior Publication Data

US 2015/0271813 A1   Sep. 24, 2015

(30) Foreign Application Priority Data

Mar. 21, 2014 (KR) .................. 10-2014-0033648

(51) Int. Cl.
| | |
|---|---|
| *H04L 5/00* | (2006.01) |
| *H04W 48/02* | (2009.01) |
| *H04W 84/12* | (2009.01) |
| *H04W 84/18* | (2009.01) |
| *H04W 48/14* | (2009.01) |

(52) U.S. Cl.
CPC .......... *H04L 5/0092* (2013.01); *H04W 48/02* (2013.01); *H04W 48/14* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,657,255 B2 | 2/2010 | Abel et al. | |
| 2005/0266826 A1* | 12/2005 | Vlad | H04L 63/0492 455/410 |
| 2007/0234054 A1* | 10/2007 | Robert | H04L 63/0823 713/170 |
| 2008/0136621 A1* | 6/2008 | Malik | H04W 48/14 340/539.1 |
| 2009/0064299 A1* | 3/2009 | Begorre | H04W 12/12 726/7 |
| 2011/0211219 A1* | 9/2011 | Bradley | H04W 48/16 358/1.15 |
| 2012/0054353 A1* | 3/2012 | Jung | H04W 88/04 709/227 |
| 2012/0083208 A1 | 4/2012 | Giles et al. | |
| 2012/0087300 A1* | 4/2012 | Seok | H04W 76/02 370/315 |
| 2012/0198531 A1* | 8/2012 | Ort | H04W 12/08 726/7 |

(Continued)

*Primary Examiner* — Chi H Pham
*Assistant Examiner* — Vladislav Agureyev
(74) *Attorney, Agent, or Firm* — The Farrell Law Firm, P.C.

(57) ABSTRACT

A method for collecting an Access Point (AP) is provided. The method includes detecting, by a first device, tagging of a second device; when the tagging of the second device is detected, transmitting, by the first device, to the AP, a request message for requesting access to the second device; and when the access to the second device is allowed, transmitting, to the second device, AP information required for an AP connection.

18 Claims, 7 Drawing Sheets

(56) References Cited

U.S. PATENT DOCUMENTS

| | | | | |
|---|---|---|---|---|
| 2012/0276910 A1* | 11/2012 | Zhang | .............. | H04W 36/0005 |
| | | | | 455/439 |
| 2013/0107806 A1* | 5/2013 | Lee | ...................... | H04W 48/14 |
| | | | | 370/328 |
| 2013/0115915 A1* | 5/2013 | Tipton | .................. | H04W 12/08 |
| | | | | 455/411 |
| 2013/0148568 A1* | 6/2013 | Iimori | .................. | H04W 40/02 |
| | | | | 370/315 |
| 2013/0247161 A1* | 9/2013 | Bajko | .................. | H04L 9/3268 |
| | | | | 726/7 |
| 2013/0282903 A1* | 10/2013 | DeLuca | ................ | H04W 12/04 |
| | | | | 709/225 |
| 2013/0331053 A1* | 12/2013 | Vick | ...................... | H04W 4/22 |
| | | | | 455/404.1 |
| 2014/0094145 A1* | 4/2014 | Takahashi | ............. | H04W 12/06 |
| | | | | 455/411 |
| 2014/0119234 A1* | 5/2014 | Kwon | ................ | H04W 76/025 |
| | | | | 370/254 |
| 2014/0293331 A1* | 10/2014 | Asai | ...................... | G06F 3/1286 |
| | | | | 358/1.15 |
| 2015/0195710 A1* | 7/2015 | Bar-Niv | ................ | H04W 12/08 |
| | | | | 726/23 |

\* cited by examiner

SYSTEM, METHOD AND APPARATUS FOR CONNECTING ACCESS POINT

PRIORITY

This application claims priority under 35 U.S.C. §119(a) to Korean Patent Application No. 10-2014-0033648, filed in the Korean Intellectual Property Office on Mar. 21, 2014, the entire content of which is incorporated herein by reference.

BACKGROUND OF THE INVENTION

1. Field of the Invention

The present invention generally relates to a system, method and apparatus for connecting an Access Point (AP), which can connect a second device with an AP by a communication channel through short-range wireless communication with a first device connected to the AP.

2. Description of the Related Art

In recent years, with the development of digital technologies, users variously use portable terminals while the portable terminals are connected to other devices (e.g., an audio, a printer, a TV, a notebook, etc.). Examples of the devices which are connectable with such portable terminals correspond to a device which needs to be connected with an AP, such as a docking audio, a network printer, etc.

However, some of the devices which need to be connected with an AP do not have an input means and a display means, so it is difficult to connect with the AP. For example, a user should make a connection with the AP by inputting AP information through an Application (App) for a configuration or through a wired connection in order to connect a device to the AP. That is, the device cannot connect with the AP by directly acquiring the AP information and a user needs to input the AP information in order to connect with the AP.

SUMMARY OF THE INVENTION

The present invention has been made to address at least the above-mentioned problems and/or disadvantages and to provide at least the advantages described below.

Accordingly, an aspect of the present invention enables a second device to acquire information (AP information) required for a connection to an AP by tagging with a first device connected to the AP.

Another aspect of the present invention directly or indirectly transmits the AP information to the second device.

Another aspect of the present invention stores, in the AP or an external server, reference information for determining whether the AP information is transmitted.

Another aspect of the present invention configures limited information for limiting sharing of the AP information.

In accordance with an aspect of the present invention, a method for connecting an Access Point (AP) is provided The method includes detecting, by a first device, tagging of a second device; when the tagging of the second device is detected, transmitting, by a first device, to the AP, a request message for requesting access to the second device; and when the access to the second device is allowed, transmitting, to the second device, AP information required for an AP connection.

In accordance with another aspect of the present invention, a system for connecting an AP is provided. The system includes a first device configured to detect tagging of a second device, when tagging of the second device is detected, to transmit, to the AP, a request message for requesting access to the second device; the AP configured to receive the request message from the first device, and to determine whether the access is allowed or not; and a second device configured to acquire AP information required for an AP connection from the first device or the AP, and to be connected to the AP using the acquired AP information.

In accordance with another aspect of the present invention, an apparatus for connecting an AP is provided. The apparatus includes a Wireless Local Area Network (WLAN) module configured to make a connection with the AP; a short-range communication module configured to detect tagging of a device; and a controller configured to, when the tagging of the device is detected through the short-range communication module, transmit, to the AP, a request message for requesting access to the tagged device, to receive, from the AP, AP information required for an AP connection, and to transmit the received AP information to the tagged device.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. It should be noted that the same elements will be designated by the same reference numerals although they are shown in different drawings. Further, detailed descriptions related to well-known functions or configurations capable of making subject matter of the present invention unnecessarily obscure will be omitted.

Meanwhile, various embodiments of the present invention shown and described in this specification and the drawings correspond to specific examples presented in order to easily explain technical contents of the present invention, and to help comprehension of the present invention, but are not intended to limit the scope of the present invention. It will be apparent to those having ordinary knowledge in the technical field, to which the present invention pertains, that it is possible to practice other modified embodiments based on the technical idea of the present invention as well as the embodiments disclosed herein.

Before the detailed description of the present disclosure, it should be appreciated that a first device according to an embodiment of the present invention may be an electronic device that may include at least one of a smart phone, a Personal Digital Assistant (PDA), a tablet Personal Computer (PC), a Portable Multimedia Player (PMP), a mobile phone, a video phone, an e-book reader, a desktop PC, a laptop PC, a netbook computer, an MP3 player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to an embodiment of the present invention, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to an embodiment of the present invention, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) device of a shop.

According to an embodiment of the present invention, the electronic devices may include at least one of furniture or a part of a building/structure having a communication function, electronic boards, electronic signature receiving devices, projectors, or various measuring equipment (e.g., equipment for a water supply, electricity, gas or radio waves).

The electronic device according to various embodiments of the present invention may be a combination of one or more of above described various devices. Also, the electronic device according to various embodiments of the present invention may be a flexible device. Also, the electronic device according to various embodiments of the present invention is not limited to the above described devices.

Figure 1A:
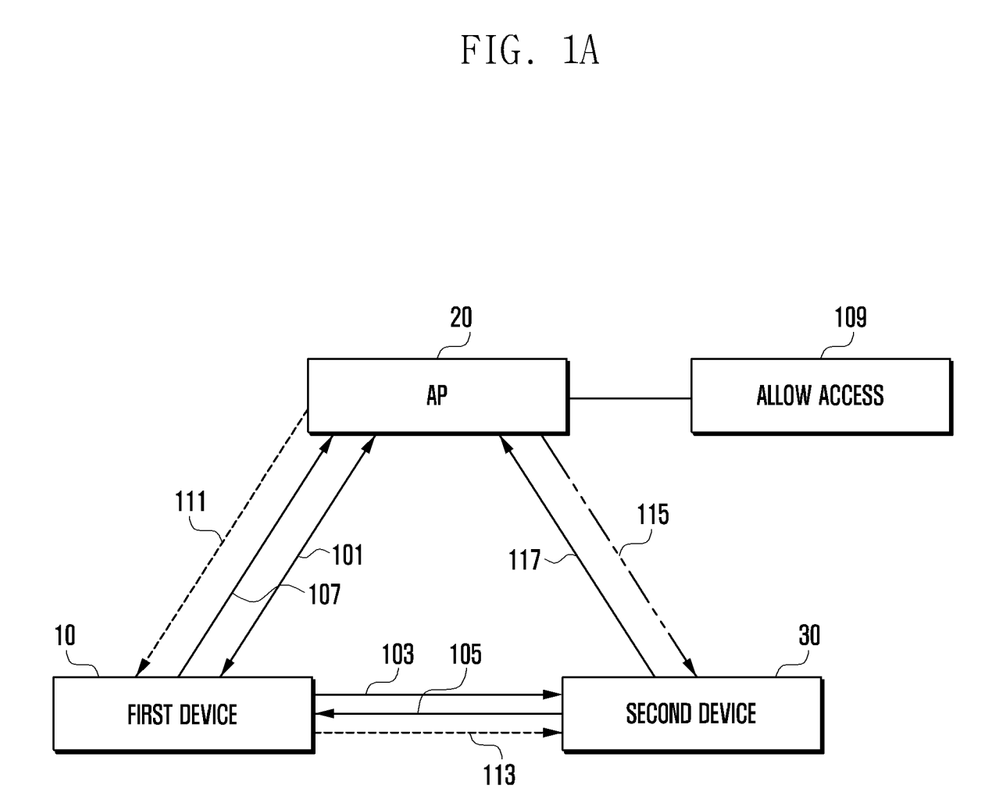
FIG. 1A illustrates an access point connection system according to an embodiment of the present invention.

FIG. 1A illustrates an access point connection system according to an embodiment of the present invention.

Referring to FIG. 1A, a first device 10 is connected to an Access Point (AP) 20 as indicated by reference numeral 101. At this time, the first device 10 may receive, from the AP 20, information required for AP access (hereinafter, referred to as AP information) and store the AP information. The AP information may include a Service Set IDentifier (SSID) and a PassWord (P/W).

A user may need a connection between a second device 30 and the AP 20 in order to use the second device 30. In an embodiment of the present invention, the second device 30 may correspond to a wireless audio, a network printer, a portable terminal of another user, and the like, which can be used while being connected to the AP 20. A user tags the second device 30 to the first device 10 connected to the AP 20 (or the first device 10 to the second device 30) in order to connect the second device 30 with the AP 20 as indicated by reference numeral 103.

The second device 30 transmits device information thereof (e.g., a Media Access Control (MAC) address, a device IDentification (ID), a phone number, etc.) to the first device 10 as indicated by reference numeral 105 when the second device 30 is tagged to the first device 10.

The first device 10 stores the transmitted device information of the second device 30 and transmits an access request message of the second device 30 to the AP 20 as indicated by reference numeral 107. The access request message, which is a message for inquiring to the AP 20 whether the access of the second device 30 to the AP 20 is allowed, may include identification information indicating the type of the access request message, information of the first device 10, and information of the second device 30.

The AP 20 identifies which device requests access thereto, through the information of the second device 30 and an access request, which are transmitted from the first device 10. The AP 20 responds to the access request as indicated by reference numeral 109. For example, the AP 20 identifies whether the information of the second device 30 exists in a memory thereof or whether reference information (e.g., a list of devices) is stored in a server (e.g., a computer connected to the AP 20). The reference information may be stored in various schemes such as a table, a list, a database, etc. The AP 20 may allow the access of the second device 30, when the information of the second device 30 exists in the reference information, and may disallow the access, when the information of the second device 30 does not exist in the reference information.

The AP 20 directly or indirectly transmits, to the second device 30, a response to the access request.

When the response is indirectly transmitted, the AP 20 transmits, to the first device 10, a response message according to the access request as indicated by reference numeral 111. When receiving, from the AP 20, the response message for allowing the access, the first device 10 transmits the stored AP information (SSID and P/W) to the second device 30 as indicated by reference numeral 113. At this time, the first device 10 transmits the AP information to the second device 30 not by tagging of the second device 30 but through a wireless channel (e.g., a Wi-Fi L2 layer).

When the response is directly transmitted, the AP 20 directly transmits, to the second device 30, a response message according to the access request as indicated by reference numeral 115. For example, the AP 20 directly transmits, to the second device 30, a response message for allowing the access, through a wireless channel (e.g., a Wi-Fi L2 layer). The response message may include its own AP information (e.g., a SSID and a P/W).

The second device 30, which has directly or indirectly received the response message, can be connected and access to the AP 20 through a communication channel as indicated by reference numeral 117.

Hereinabove and hereinafter, it is described that the second device 30 is tagged and then transmits device information through tagging. However, the second device 30 may transmit the device information to the first device 10 through Bluetooth, Bluetooth Low Energy (BLE), Radio Frequency IDentification (RFID), Infrared Data Association (IrDA), Ultra WideBand (UWB), ZigBee, Near Field Communication (NFC), etc.

Figure 1B:
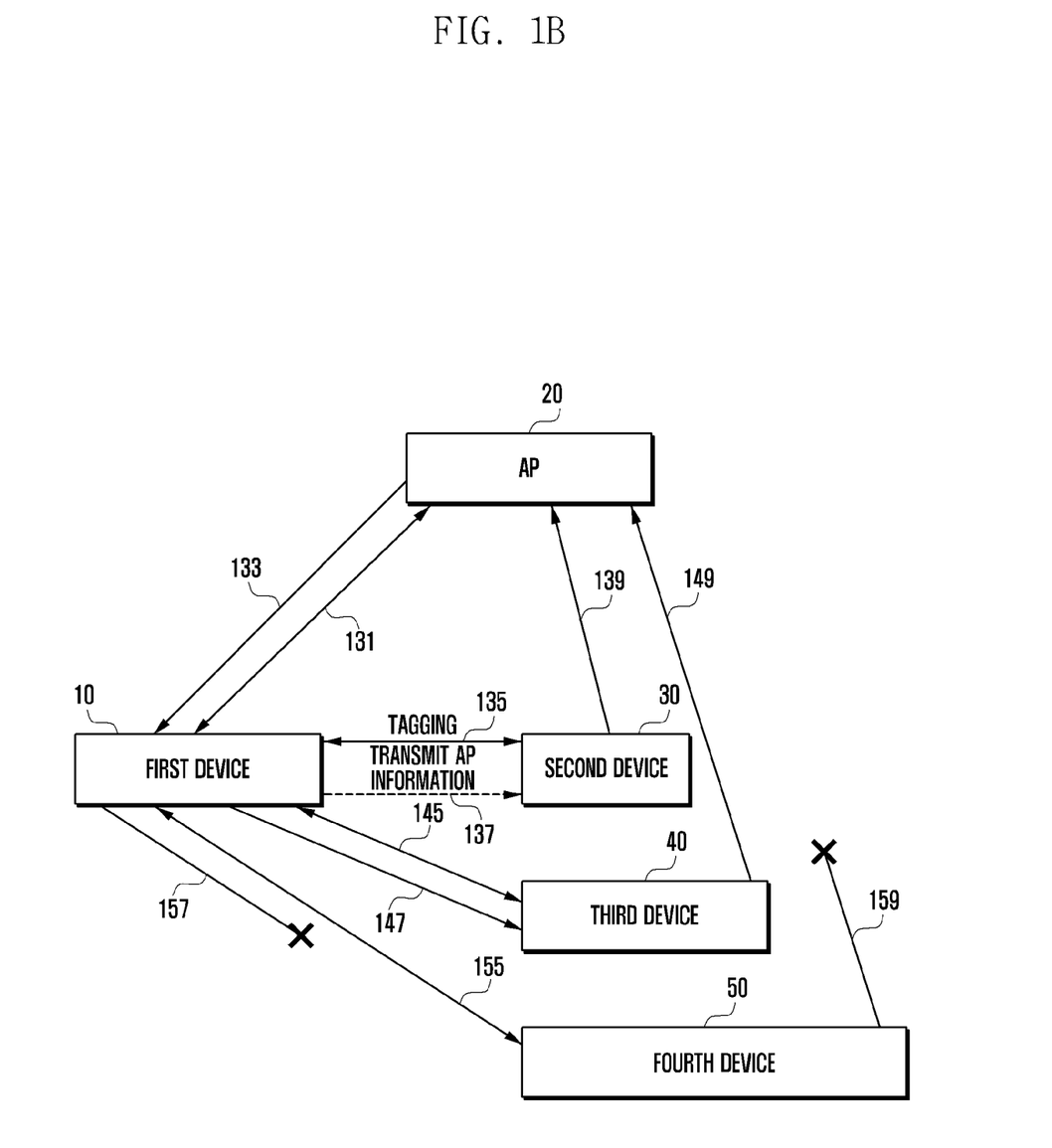
FIG. 1B illustrates an access point connection system according to an embodiment of the present invention.

FIG. 1B illustrates an access point connection system according to an embodiment of the present invention.

Referring to FIG. 1B, a first device 10 is connected to an AP 20 as indicated by reference numeral 131. At this time, the first device 10 receives, from the AP 20, limited information (e.g., the number of tagged devices connectable, the number of times which AP information can be shared, and/or a period for a connection) as indicated by reference numeral 133 and stores the limited information. Hereinafter, the limited information is configured as two times which AP information can be shared.

The first device 10 detects tagging of the second device 30 as indicated by reference numeral 135. When the tagging of the second device 30 is detected, the first device 10 identifies the limited information. Since the limited information corresponds to two times which AP information can be shared, the first device 10 transmits the AP information to the second device 30 as indicated by reference numeral 137. After transmitting the AP information one time, the first device 10 can change the limited information to share the AP information only one more time. The second device 30, which has received the AP information, can be connected to the AP 20 through a communication channel as indicated by reference numeral 139.

Similarly, the first device 10 detects tagging of a third device 40 as indicated by reference numeral 145. When detecting the tagging of the third device 40, according to the limited information, the first device 10 can share the AP information another one time, and thus, transmits the AP information to the third device 40 as indicated by reference numeral 147. After transmitting the AP information two times, the first device 10 can change the limited information and not share the AP information anymore. The third device 40, which has received the AP information, can be connected to the AP 20 through a communication channel as indicated by reference numeral 149.

The first device 10 detects tagging of a fourth device 50 as indicated by reference numeral 155. When detecting the tagging of the fourth device 50, the first device 10 can not share the AP information anymore, and thus, cannot transmit the AP information to the fourth device 50 as indicated by reference numeral 157. Further, since the fourth device 50 has not received the AP information, the fourth device 50 cannot be connected to the AP 20 through a communication channel as indicated by reference numeral 159.

Here, the second device 30, the third device 40, and the fourth device 50 do not transmit the AP information to another device even when the corresponding device detects tagging of another device while being connected to the AP 20.

Here, the limited information stored in the first device 10 may change, for example, the number of times AP information can be shared according to the number of times AP information has already been shared, but is not limited thereto. For example, the first device 10 counts the number of tagged devices connected to the AP 20, and stores the counted number. When the counted number is greater than or equal to the number of connectable devices, which is the limited information received from the AP 20, the first device 10 can subsequently limit access to a tagged device. When the counted number is less than the number of connectable devices, the first device 10 can transmit an access request message of another device to the AP 20.

Further, when the limited information includes a period for a connection (e.g., 5 minutes), access of the tagged devices to the AP 20 after the period passes can be limited.

Figure 1C:
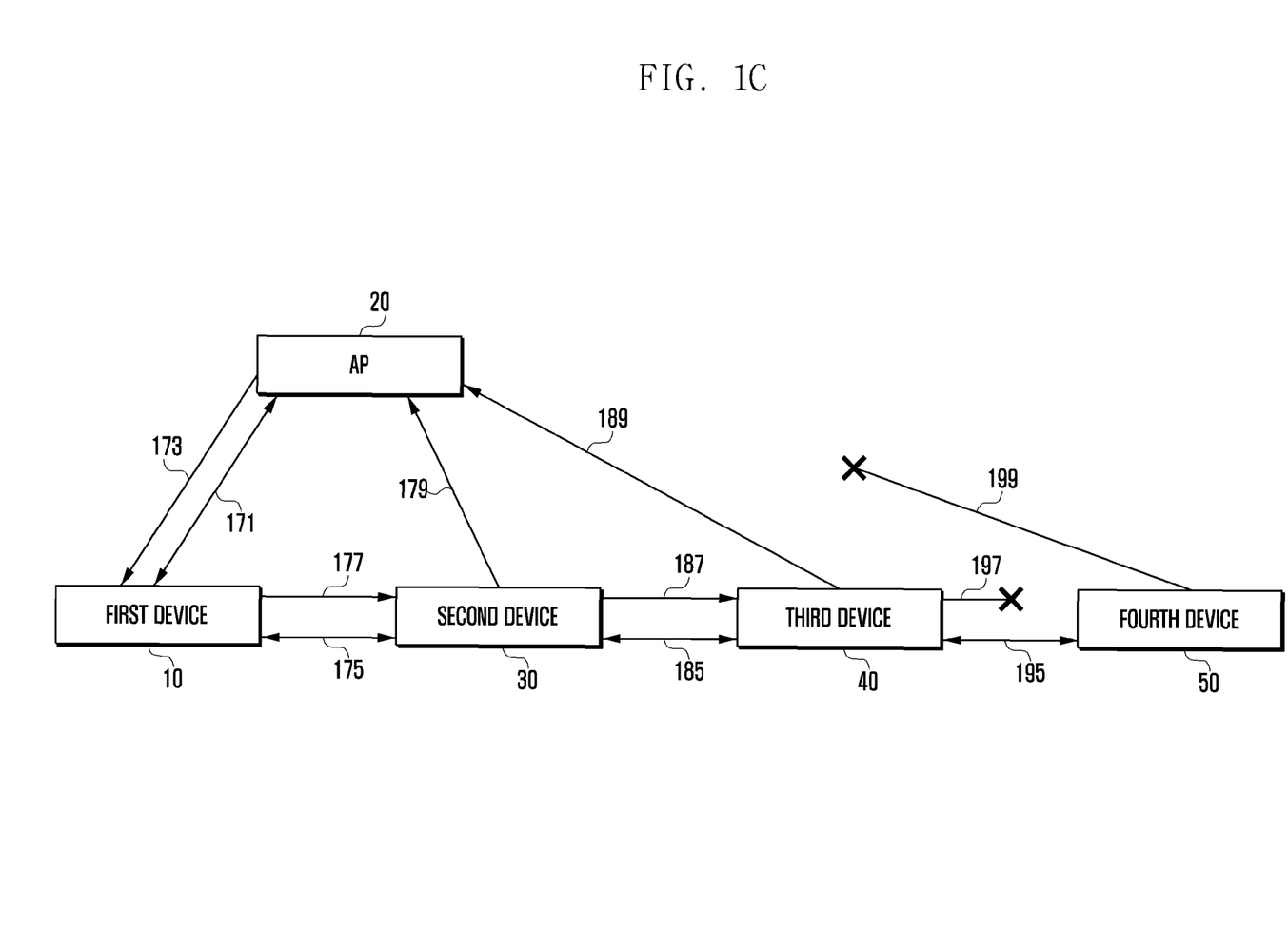
FIG. 1C illustrates an access point connection system according to an embodiment of the present invention.

FIG. 1C illustrates an access point connection system according to an embodiment of the present invention.

Referring to FIG. 1C, a first device 10 is connected to an AP 20 as indicated by reference numeral 171. At this time, the first device 10 receives, from the AP 20, limited information (e.g., the number of tagged devices connectable, the number of times which AP information can be shared, and/or a period for a connection) as indicated by reference numeral 173 and stores the limited information. Hereinafter, the limited information is configured as two times which AP information can be shared.

The first device 10 detects tagging of the second device 30 as indicated by reference numeral 175. When the tagging of the second device 30 is detected, the first device 10 identifies the limited information. Since the limited information corresponds to two times which AP information can be shared, the first device 10 transmits the AP information to the second device 30 as indicated by reference numeral 177. Further, the first device 10 may change the stored limited information to one time which AP information can be shared and transmit the changed limited information to the second device 30. Alternatively, the first device 10 may transmit unchanged limited information to the second device 30 and request the second device 30 to change the received limited information into one time which AP information can be shared. The second device 30, which has received the AP information and the changed limited information, can be connected to the AP 20 through a communication channel as indicated by reference numeral 179.

The second device 30 detects tagging of a third device 40 as indicated by reference numeral 185. When detecting the tagging of the third device 40, the second device 30 has the limited information corresponding to one time which AP information can be shared, and thus, transmits the AP information to the third device 40 as indicated by reference numeral 187. At this time, the second device 30 may change the stored limited information to one time which AP information can be shared and transmit the changed limited information to the third device 40. Alternatively, the second device 30 may transmit unchanged limited information to the third device 40 and request the third device 40 to change the received limited information into zero time which AP information can be shared. The third device 40, which has received the AP information and stored the changed limited information, can be connected to the AP 20 through a communication channel as indicated by reference numeral 189.

The third device 40 detects tagging of a fourth device 50 as indicated by reference numeral 195. When detecting the tagging of the fourth device 50, the third device 40 has the limited information corresponding to zero time which AP information can be shared, and thus, cannot transmit the AP information to the fourth device 50 as indicated by reference numeral 197. Further, since the fourth device 50 has not received the AP information, the fourth device 50 cannot be connected to the AP 20 through a communication channel as indicated by reference numeral 199.

As described above, the limited information received from the AP 20 can be sequentially transmitted from one device to another device. A device, which has transmitted the AP information and the limited information to another device, may not transmit the AP information to yet another device. For example, the first device 10, which has transmitted the AP information and the limited information to the second device 30, cannot transmit the AP information to the third device 40 even when the tagging of the third device 40, which is not connected to the AP 20, is detected. Further, a device (e.g., the third device 40 in FIG. 1C), which has received the limited information having a value of "0" (or a value of "1" and a request for changing the value of "1" to "0") cannot transmit the AP information to another device. As a result, an embodiment of the present invention can limit the access of devices and control that some devices, when the number of the devices is larger than the number configured by the AP 20, which are not connected to the AP 20.

Figure 2:
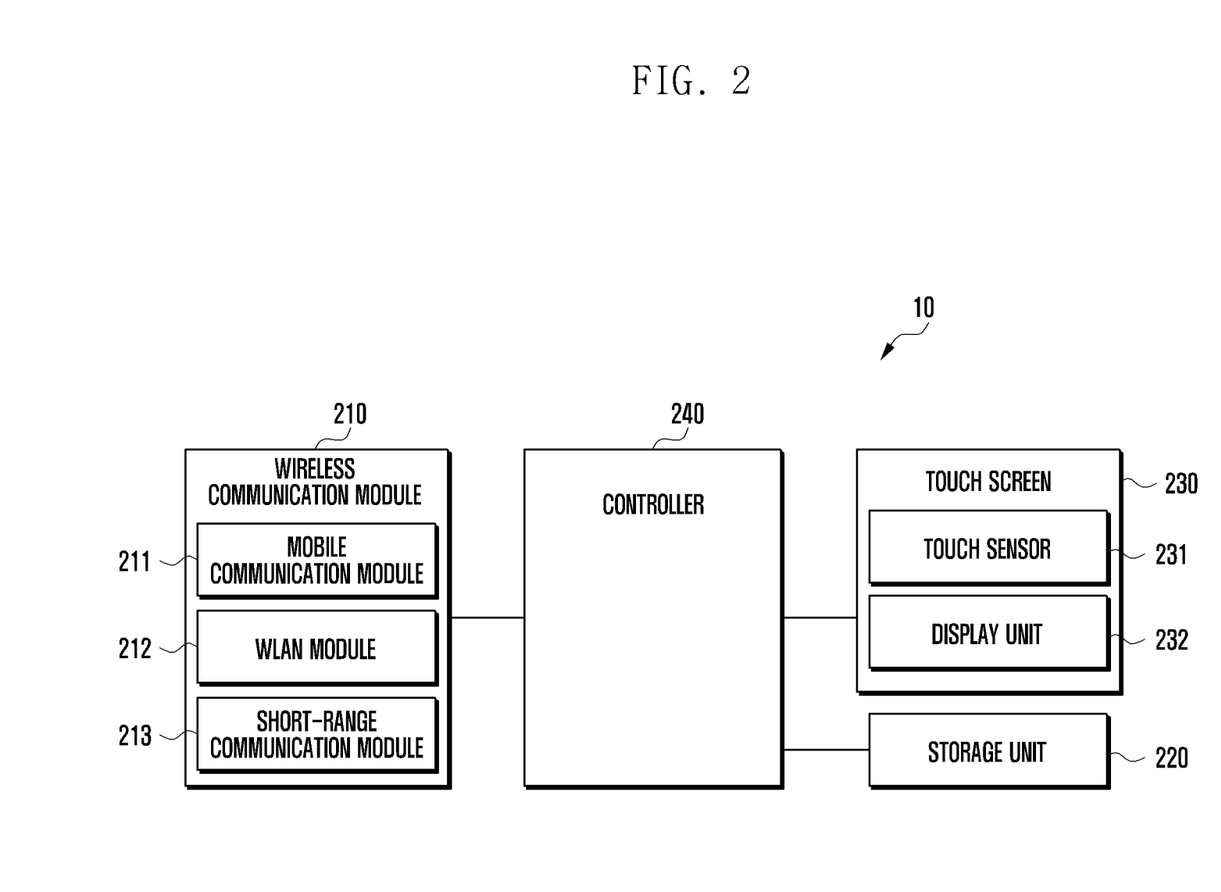
FIG. 2 is a block diagram illustrating a configuration of a first device according to an embodiment of the present invention.

FIG. 2 is a block diagram illustrating a configuration of a first device according to an embodiment of the present invention.

Referring to FIG. 2, a first device 10 according to an embodiment of the present invention includes a wireless communication unit 210, a storage unit 220, a touch screen 230, and a controller 240.

The wireless communication unit 210 may include one or more modules which enables wireless communication between the first device 10 and a wireless communication system or between the first device 10 and a second device 30. For example, the wireless communication unit 210 includes a mobile communication module 211, a Wireless Local Area Network (WLAN) module 212, a short-range communication module 213, etc.

The mobile communication module 211 transmits/receives a wireless signal to/from at least one of a base station, an external terminal, and various servers (e.g., an integration server, a provider server, a content server, an internet server, a cloud server, and the like) in a mobile communication network. Examples of the wireless signal may include a voice call signal, a video call signal, and data having various forms according to the transmission/reception of text/multimedia messages.

The WLAN module 212, which is a module for providing wireless Internet access and wireless LAN link to a device, may be embedded in or mounted on the first device 10. Wireless Fidelity (Wi-Fi), Wireless broadband (Wibro), World Interoperability for Microwave Access (WiMAX), High Speed Downlink Packet Access (HSDPA), and the like, may be employed as a wireless Internet technology. Further, the WLAN module 212 transmits/receives various pieces of data (e.g., an image, a video, a music, etc.) to/from another device according to the selection of a user when WLAN link with another device is made. The wireless LAN module 212 may be maintained in a turned-on status or may be turned on according to a user's configuration or input.

In particular, the WLAN module 212 according to an embodiment of the present invention provides a wireless channel between the first device 10 and the AP 20 and receives AP information (e.g., a SSID and a P/W) from the AP 20. The WLAN module 212 transmits, to the AP 20, information of the second device 30 (e.g., a MAC address, a device ID, a phone number, etc.) and/or information of the first device 10 (e.g., a MAC address, a device ID, a phone number, etc.). Further, the WLAN module 212 transmits, to the AP 20, an access request message of the second device 30.

The WLAN module 212 receives, from the AP 20, limited information (e.g., the number of tagged devices connectable, the number of times which the AP information can be shared, and/or a period for a connection). Further, the WLAN module 212 transmits, to the second device 30, the AP information received from the AP 20.

The short-range communication module 213 represents a module for short range communication. Bluetooth, Bluetooth Low Energy (BLE), Radio Frequency Identification (RFID), Infrared Data Association (IrDA), Ultra Wideband (UWB), ZigBee, Near Field Communication (NFC), and the like, may be used as a short range communication technology. Further, when short-range communication with another device (e.g., the second device 30) is made, the short-range communication module 213 transmits/receives various pieces of data (e.g., an image, a video, a music, etc.) to/from another device according to the selection of a user. The short-range communication module 213 may be maintained in a turned-on status or may be turned on according to a user's configuration or input.

The short-range communication module 213 according to an embodiment of the present invention receives device information of the second device 30 (e.g., a MAC address, a device ID, a phone number, etc.). For example, the short-range communication module 213 receives information of a device from the second device 30 when tagging of the second device 30 is made.

The storage unit 220 stores a program and data required for operating the first device 10, and may be divided into a program area and a data area. The program area stores a program for controlling an overall operation of the first device 10, an Operating System (OS) for booting the first device 10, an application program, etc. The data area, which is an area where data is generated according to the use of the first device 10, stores an image, a video, etc.

In particular, the storage unit 220 according to an embodiment of the present invention stores AP information received from the AP 20 (e.g., a SSID and a PW). Further, the storage unit 220 stores device information received from the second device 30 (e.g., a MAC address, a device ID, a phone number, etc.). The storage unit 220 stores limited information (e.g., the number of connectable devices, the number of times which the AP can be shared, and/or a period for a connection) received from the AP 20. The storage unit 220 stores the number of tagged devices that have been connected to the AP 20. This disallows some devices, when the number of the devices is greater than or equal to a predetermined number, to be connected to the AP 20.

The touch screen 230, which is an input/output means for simultaneously performing an input function and a display function, may include a touch sensor 231 and a display unit 232. In particular, in an embodiment of the present invention, the touch screen 230 displays a screen according to an operation of the first device 10 through the display unit 232 (e.g., a short-range communication execution screen, a WLAN connection configuration screen, a gallery screen, etc.). Further, when a touch event of a user is detected by the touch sensor 231 while a specific screen is displayed through the display unit 232, the touch screen 230 transmits an input signal according to the touch event to the controller 240. Then, the controller 240 recognizes the touch event and controls an operation according to the touch event.

The touch screen 230 detects a user's touch event, which is in contact with a surface of the touch screen 230 (e.g., a tap, a drag, a sweep, a flick, a multi-touch, etc.). When detecting a user's touch event on the surface of the touch screen 230, the touch sensor 231 detects coordinates where the touch event is generated and transmits the detected coordinate to the controller 240. The controller 240 performs a function corresponding to the touch event according to a signal transmitted from the touch sensor 231.

The display unit 232 displays various screens according to the use of the first device 10. For example, the display unit 232 visually provides a menu, input data, and various pieces of information to a user. The display unit 232 may be configured as a Liquid Crystal Display (LCD), an Organic Light Emitting Diode (OLED), etc.

The controller 240 controls an overall operation of the first device 10 and a signal flow between components inside the first device 10 (the wireless communication unit 210, the storage unit 220, and the touch screen 230), processes data, and controls power supplied from a battery to the components.

For example, the controller 240 according to an embodiment of the present invention controls a communication channel connection procedure between the AP 20 and the second device 30. The controller 240 makes a connection with the AP 20 through a wireless channel using the WLAN module 212. The controller 240 receives the limited information from the AP 20 and stores the limited information in the storage unit 220. When tagging of the second device 30 is detected, the controller 240 receives and stores device information of the second device 30. Further, the controller 240 transmits, to the AP 20, the device information of the second device 30 and a request message for requesting access of the second device 30.

The controller 240 counts the number of tagged devices connected to the AP 20, and stores the counted number in the storage unit 220. When the counted number is greater than or equal to the number of devices connectable, which is the limited information received from the AP 20, the controller 240 limits the access of a device so that the device is not connected to the AP 20 even when the tagging of the device is detected, and transmits an access limitation message to a tagged device. When the counted number is less than the number of devices connectable, which is the limited information received from the AP 20, the controller 240 transmits an access request message of the tagged device to the AP 20.

The controller 240 receives, from the AP 20, a response message for an access request of the second device 30. When receiving a response message for allowing access to the second device 30, the controller 240 transmits AP information (e.g., a SSID and a PW) to the second device 30 through a wireless channel (e.g., a Wi-Fi L2 layer).

Figure 3:
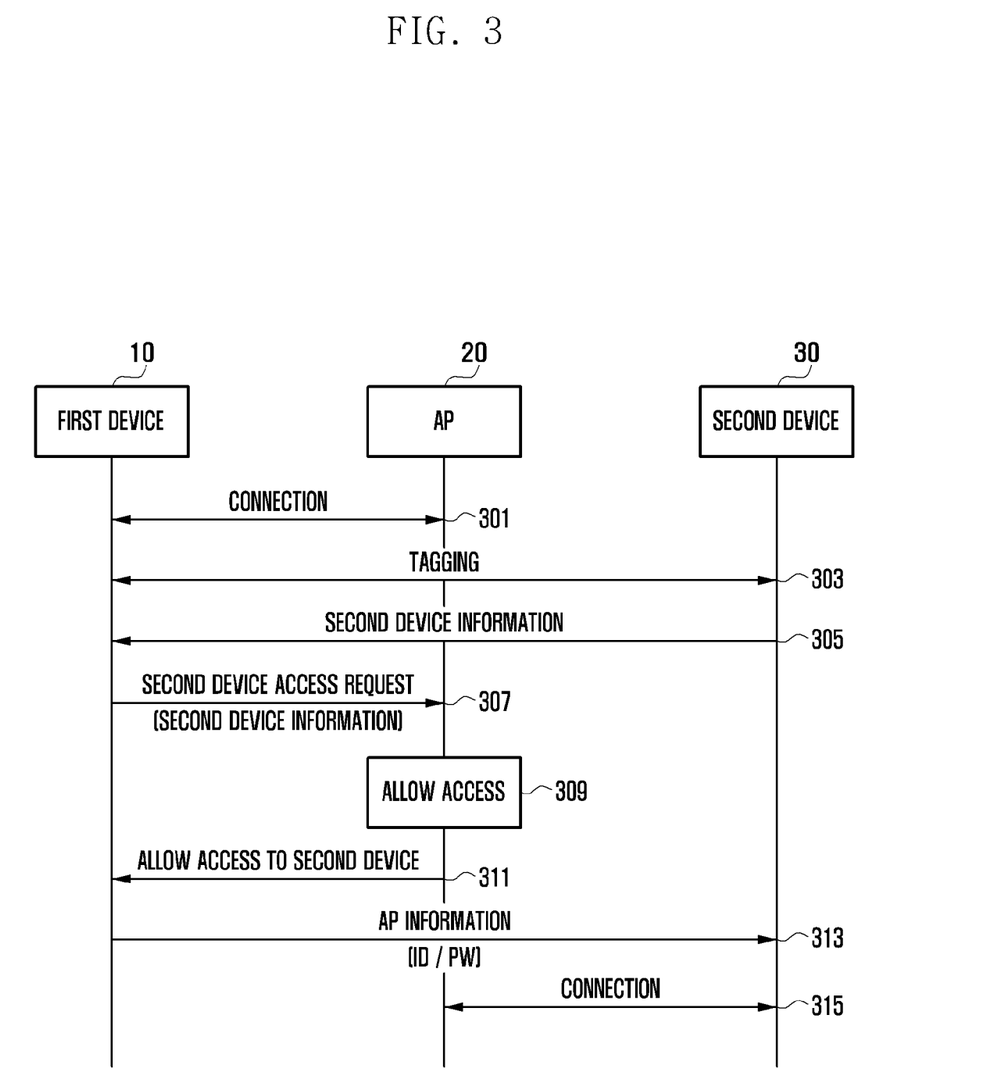
FIG. 3 is a signal flow diagram illustrating a process of configuring a communication channel between a second device and an AP according to the first embodiment of the present invention.

FIG. 3 is a signal flow diagram illustrating a process of configuring a communication channel between a second device and an AP according to a first embodiment of the present invention.

Referring to FIG. 3, in step 301, a first device 10 is connected to an AP 20. Here, the first device 10 stores AP information input by a user (e.g., a SSID and a PW), and requests a connection to the corresponding AP 20. The first device 10 transmits device information thereof (e.g., a MAC address, a device ID, a phone number, etc.) when the connection request is transmitted to the AP 20. The AP 20 identifies that the first device 10 requests a connection thereto through the transmitted device information.

In an embodiment of the present invention, the AP 20 may transmit, to the first device 10, the limited information (e.g., the number of tagged devices connectable, the number of times which the AP information can be shared, and/or a period (limited time) for a connection). The first device 10 may receive the limited information from the AP 20 and store the received limited information.

In step 303, the first device 10 is tagged by the second device 30. When the tagging of the second device 30 is detected, the first device 10 can request, to the AP 20, the access of the second device 30 to the AP 20.

In step 305, the second device 30 transmits, to the first device 10, device information thereof (e.g., a MAC address, a device ID, a phone number, etc.). The first device 10 stores the transmitted device information of the second device 30.

In step 307, the first device 10 transmits, to the AP 20, a request message which requests a connection of the second device 30 to the AP 20, in response to the detection of tagging of the second device 30. The request message, which is a message for asking whether to allow the access of the second device 30 to the AP 20, may include identification information indicating the type of request message, device information of the first device 10, and the device information of the second device 30.

In accordance with another embodiment of the present invention, when the number of tagged devices connected to the AP 20 is greater than or equal to the number of tagged devices connectable, which is the limited information received from the AP 20, even when the tagging is detected, the first device 10 limits the access of the devices so that some of the devices are not connected to the AP, and transmits an access limitation message to the tagged device (e.g., the second device 30). When the number of tagged devices connected to the AP 20 is less than the number of tagged devices connectable, which is the limited information received from the AP 20, the first device 10 transmits an access request message of the tagged device (e.g., the second device 30), to the AP 20.

When receiving the access request message, the AP 20 determines whether to allow the access of the second device 30 in step 309. For example, the AP 20 identifies whether the received device information of the second device 30 exists in a list of devices stored in a memory thereof or a server. When the device information exists in the list of devices, the access is allowed, and when the device information does not exist in the list of devices, the access is disallowed. For example, the AP 20 may generate a response message including a predetermined value (e.g., a value for YES or NO is configured in advance) according to whether the access is allowed or not. As another example, when the AP 20 includes a display device (e.g., a mobile AP) or is connected to a device including a display device, the AP 20 may output a pop-up window which asks a use of the AP 20 or a manager whether the access is allowed.

Here, it is assumed that the access to the second device 30 is allowed. In other words, in step 309, the AP 20 allows the access of the second device 30 and generates a response message corresponding thereto.

In step 311, the AP 20 transmits, to the first device 10, a response message according to whether the access of the second device 30 is allowed.

In step 313, when receiving the response message according to whether the access is allowed, from the AP 20, the first device 10 transmits, to the second device 30, the AP information about the AP 20 (a SSID and a P/W) through a wireless channel (e.g., a Wi-Fi L2 layer).

In step 315, the second device 30 is connected to the AP 20 through a wireless communication channel using the AP information transmitted from the first device 10. In accordance with some embodiments of the present invention, the AP 20 may detect the connection of the second device 30, and notify the first device 10 that the second device 30 is connected.

Figure 4:
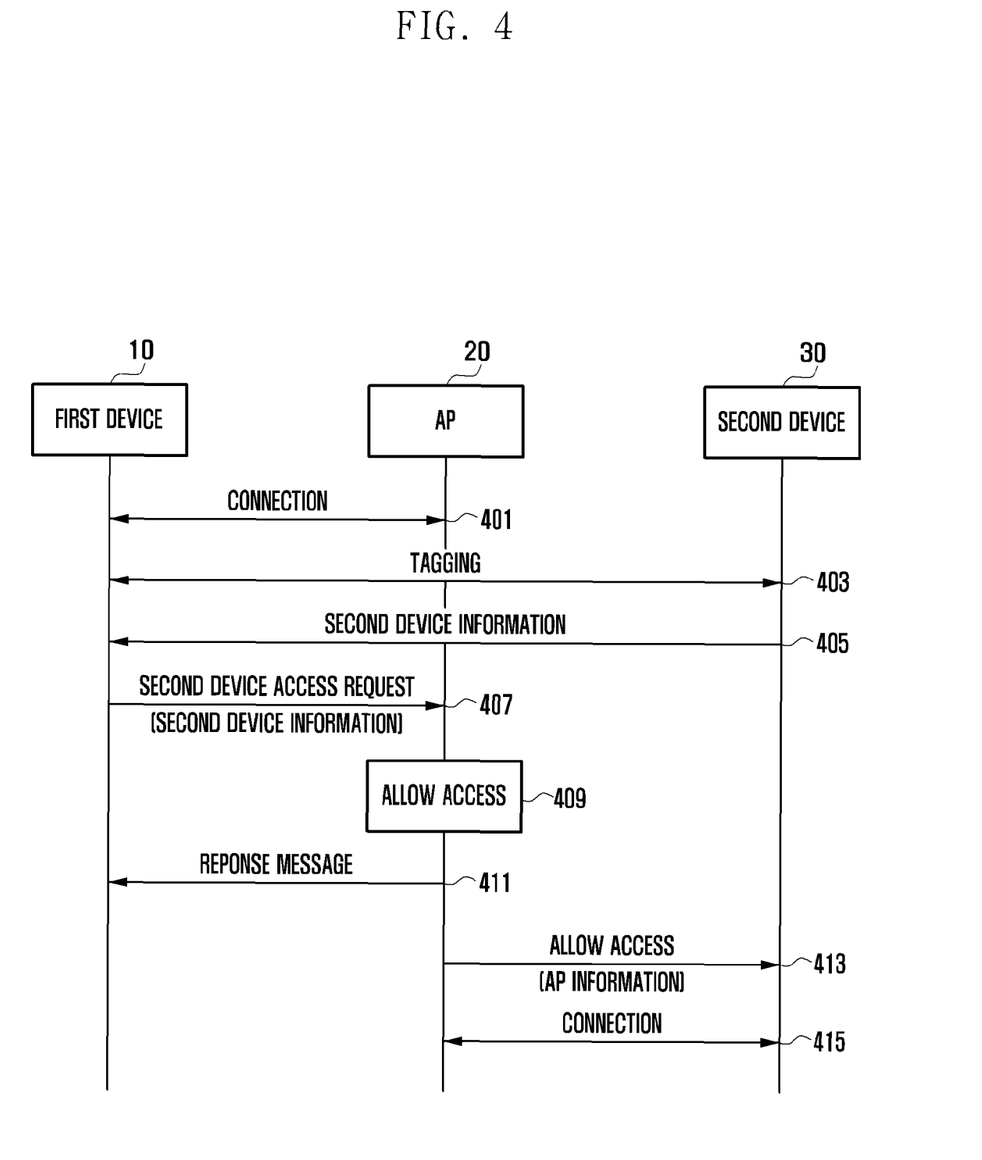
FIG. 4 is a signal flow diagram illustrating a process of configuring a communication channel between a second device and an AP according to a second embodiment of the present invention.

FIG. 4 is a signal flow diagram illustrating a process of configuring a communication channel between a second device and an AP according to a second embodiment of the present invention.

Referring to FIG. 4, in step 401, a first device 10 is connected to an AP 20. The first device 10 may store AP information input by a user (e.g., a SSID and a PW), and request connection from the corresponding AP 20. The first device 10 may transmit device information thereof (e.g., a MAC address, a device ID, a phone number, etc.) when a connection request is transmitted to the AP 20.

The AP 20 may identify that the first device 10 requests connection thereto through the transmitted device information. In accordance with some embodiments of the present invention, when being connected to the first device 10, the AP 20 may transmit limited information to the first device 10. The first device 10 may receive the limited information from the AP 20 and store the received limited information.

In step 403, the second device 30 is tagged with the first device 10, or is tagged by the first device 10. When the tagging of the second device 30 is detected, the first device 10 can infer that the second device 30 requests the access to the AP 20.

In step 405, the second device 30 transmits, to the first device 10, device information thereof (e.g., a MAC address, a device ID, a phone number, etc.). The first device 10 may store the transmitted device information of the second device 30.

In step 407, the first device 10 transmits, to the AP 20, a request message which requests a connection of the second device 30 to the AP 20, in response to the detection of tagging of the second device 30. The request message, which is a message for asking whether to allow the access of the second device 30, may include identification information indicating the type of the request message, device information of the first device 10, and the device information of the second device 30.

In accordance with another embodiment of the present invention, when the number of tagged devices connected with the AP 20 is greater than or equal to the number of devices connectable, which is the limited information received from the AP 20, even when the tagging is detected, the first device 10 limits the access of the devices so that some of the devices are not connected to the AP, and transmits an access limitation message to the tagged device (e.g., the second device 30). When the number of tagged devices connected to the AP 20 is less than the number of devices connectable, which is the limited information received from the AP 20, the first device 10 transmits an access request message of the tagged device (e.g., the second device 30), to the AP 20.

When receiving the access request message, the AP 20 determines whether to allow the access of the second device 30 in step 409. For example, the AP 20 identifies whether the received device information of the second device 30 exists in a list of devices stored in a memory thereof or a server. When the device information exists in the list of devices, the access is allowed, and when the device information does not exist in the list of devices, the access is disallowed. For example, the AP 20 may generate a response message including a predetermined value (e.g., a value for YES or NO is configured in advance) according to whether the access is allowed or not. As another example, the AP 20 may output a popup window which asks whether to allow the access of the second device 30.

Here, it is assumed that the access of the second device 30 is allowed. In other words, in step 409, the AP 20 allows the access of the second device 30 and generates a response message corresponding thereto.

In step 411, the AP 20 transmits, to the first device 10, a response message according to whether the access of the second device 30 is allowed. When receiving the response message from the AP 20, it is determined that the second device 30 is allowed to be connected to the AP 20. As a result, the first device 10 may limit the access of some devices, when the number of the devices is greater than or equal to a predetermined number, so that some devices are not connected to the AP 20. For example, when the number of tagged devices connected to the AP 20 is greater than or equal to the predetermined number, the first device 10 does not transmit an access request message and may transmit, to the tagged device, an access limitation message. When the number of connected devices is not limited, step 411 may be omitted.

In step 413, the AP 20 transmits, to the second device 10, a response message according to whether the access is allowed and the AP information. The second device 30 receives the response message and the AP information. At this time, the AP information and the response message according to the access allowance may be transferred from the AP 20 to the second device 30 through a wireless channel (e.g., Wi-Fi L2 layer).

In step 415, the second device 30 is connected to the AP 20 through a communication channel using the received AP information. In accordance with some embodiments of the present invention, the AP 20 may detect the connection of the second device 30, and notify the first device 10 that the second device 30 is connected.

Figure 5:
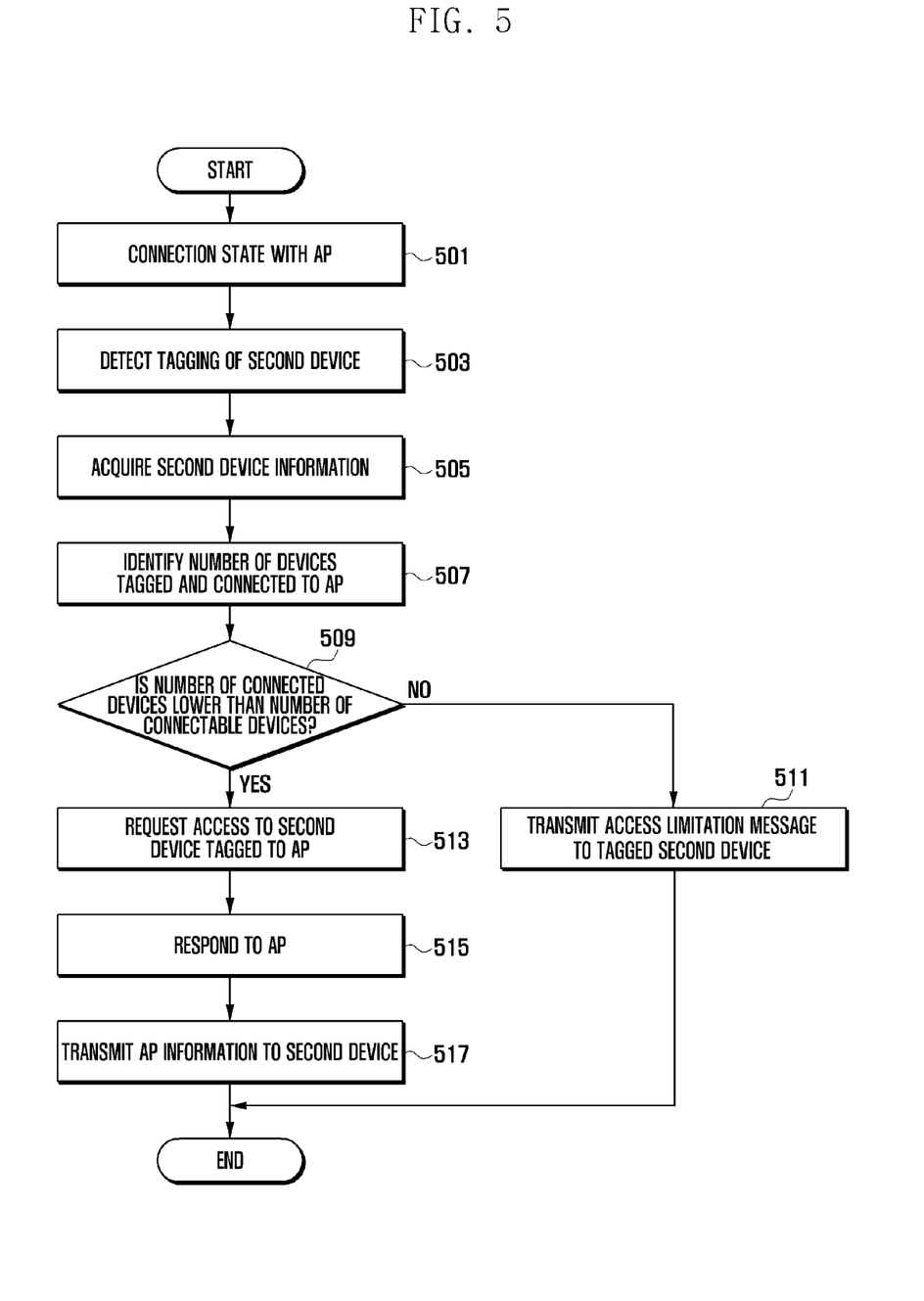
FIG. 5 is a flowchart illustrating an access point connection process of a first device according to an embodiment of the present invention.

FIG. 5 is a flowchart illustrating a process of connecting an access point of a first device according to an embodiment of the present invention.

Referring to FIG. 5, in step 501, a first device 10 is connected to an AP 20. For example, a controller 240 may transmit device information (e.g., a MAC address, a device ID, a phone number, etc.) when a request for a connection is transmitted to the AP 20. The controller 240 may receive AP information (e.g., a SSID and a PW) from the AP 20 and store the received AP information. In accordance with some embodiments of the present invention, the controller 240 may receive the limited information from the AP 20 and store the received limited information.

In step 503, the controller 240 detects tagging of at least one device (e.g., a second device 30).

In step 505, the controller 240 acquires device information of the at least one tagged device (e.g., a MAC address, a device ID, a phone number, etc.).

In step 507, the controller 240 identifies and stores the number of tagged devices connected to the AP 20.

In step 509, the controller determines whether the number of the tagged device connected to the AP 20 is less than the number of connectable devices, which is the limited information received from the AP 20.

In step 509, when the number of tagged devices connected to the AP 20 is greater than or equal to the number of connectable devices, the controller 240 proceeds to step 511 to transmit a connection disablement message to the tagged device (i.e., the second device 30). In other words, the controller 240 limits the number of devices connected to the AP 20.

In step 509, when the number of tagged devices connected to the AP 20 is less than the number of connectable devices, the controller 240 proceeds to step 513 to transmit, to the AP 20, device information of the second device 30 (e.g., a MAC address, a device ID, a phone number, etc.) and a request message which requests access of the second device 30 to the AP 20.

In step 515, the controller 240 receives, from the AP 20, a response message for an access request of the second device 30. For example, the controller 240 may receive, from the AP 20, a response message which allows the access of the second device or a response message which disallows the access of the second device 30.

In step 517, when receiving the response message which allows the access of the second device 30, the controller 240 transmits, to the second device 30, the AP information (e.g., a SSID and a PW). At this time, the controller 240 may transmit, to the second device 30, the AP information through a wireless channel (e.g., a Wi-Fi L2 layer). In accordance with some embodiments of the present invention, when receiving, from the AP 20, the response message which allows the access, the controller 240 may determine that the second device 30 is connected to the AP 20 and update the number of devices connected to the AP 20.

In an embodiment of the present invention in which the AP 20 directly transmits the AP information to the second device 30, for example, the second embodiment of the present invention described with reference to FIG. 4, step 517 may be omitted.

As described above, various embodiments of the present invention can enable a second device to easily acquire AP information through tagging of the second device to be connected to an AP, the tagging being related to a first device connected to the AP, and can enable the second device to be easily connected to the AP through a communication channel.

According to various embodiments of the present invention, at least part of a device (for example, modules or functions thereof) or a method (for example, operations) according to the various embodiments of the present invention may be embodied by, for example, an instruction stored in a computer readable storage medium provided in a form of a programming module. When the command is executed by one or more processors (for example, the processor), the one or more processors may execute a function corresponding to the command. The computer-readable storage medium may be, for example, the memory. At least some of the programming modules may be implemented (for example, executed) by, for example, the processor. At least some of the programming modules may include, for example, a module, a program, a routine, a set of instructions, or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory, and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A module or a programming module according to the present invention may include at least one of the described component elements, a few of the component elements may be omitted, or additional component elements may be included. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

Although the method and the apparatus for connecting an Access Point according to certain embodiments of the present invention have been described through the specification and drawings by using the specific terms, the embodiments and the terms are merely used as general meanings to easily describe technical contents of the present invention and assist understanding of the present invention, and the present invention is not limited to the embodiments. That is, it is obvious to those skilled in the art to which the present invention belongs that various embodiments of the present invention can be implemented based on the technical idea of the present invention without departing from the spirit and scope of the present invention as defined by the appended claims and any equivalents thereof.

What is claimed is:

1. A method for connecting an Access Point (AP), the method comprising:
   detecting, by a first device, tagging of a second device;
   when the tagging of the second device is detected, transmitting, by the first device, to the AP, a request message for requesting access to the second device; and
   when the access to the second device is allowed, transmitting, to the second device, AP information required for an AP connection,
   wherein transmitting the request message to the AP comprises:
   receiving second device information from the second device;
   identifying a number of tagged devices connected to the AP; and
   when the identified number of tagged devices connected to the AP is less than a predetermined number of connectable devices, transmitting the request message to the AP, and
   when the identified number of tagged devices connected to the AP is greater than or equal to the predetermined number of connectable devices, limiting an AP connection of the second device.

2. The method of claim 1, wherein detecting the tagging comprises detecting the tagging of the second device while the first device is connected to the AP.

3. The method of claim 1, further comprising:
   when the request message is received by the AP, determining, by the AP, whether the access to the second device is allowed; and
   transmitting, by the AP, a response message including the AP information on the basis of the determination.

4. The method of claim 3, wherein determining whether the access is allowed comprises:
   determining whether second device information exists in a predetermined device list in the AP or a server connected to the AP;
   when it is determined that the second device information exists in the predetermined device list or the server connected to the AP, allowing the access to the second device; and
   when it is determined that the second device information does not exist in the predetermined device list or the server connected to the AP, disallowing the access to the second device.

5. The method of claim 3, wherein determining whether the access is allowed comprises outputting a pop-up window which asks whether the access to the second device is allowed or not.

6. The method of claim 1, wherein the second device information includes at least one of a Media Access Control (MAC) address, a device IDentification (ID) and a phone number, and the AP information includes at least one of a Service Set IDentifier (SSID) and a password.

7. The method of claim 1, wherein transmitting the AP information to the second device comprises:
   when the request message is received from the first device, identifying, by the AP, a transmission scheme of the AP information;

when the identified transmission scheme of the AP information is an indirect transmission scheme, transmitting, by the AP, a response message including the AP information, to the first device; and when the identified transmission scheme of the AP information is a direct transmission scheme, transmitting, by the AP, the AP information, to the second device.

8. The method of claim 7, further comprising accessing, by the second device, the AP using the AP information acquired by the direct transmission scheme or the indirect transmission scheme.

9. The method of claim 1, wherein transmitting the AP information comprises transmitting the AP information to the second device through a wireless channel.

10. A system for connecting an Access Point (AP), the system comprising:
   a first device configured to detect tagging of a second device;
      when the tagging of the second device is detected, the first device configured to transmit, to the AP, a request message for requesting access to the second device;
   the AP configured to receive the request message from the first device, and to determine whether the access is allowed or not; and
   the second device configured to acquire AP information required for an AP connection from the first device or the AP, and to be connected to the AP using the acquired AP information,
   wherein the first device is further configured to identify, when the tagging of the device is detected, a number of tagged devices connected to the AP, to transmit, when the identified number of tagged devices connected to the AP is less than a predetermined number of connectable devices, the request message, and to limit, when the identified number of tagged devices connected to the AP is greater than or equal to the predetermined number of connectable devices, an AP connection of the tagged device.

11. The system of claim 10, wherein the first device is further configured:
   to receive device information of the second device;
   when the tagging of the second device is detected while being connected to the AP, to transmit, to the AP, the request message which includes the device information of the second device for requesting the access of the second device to the AP;
   to receive, when the access of the second device to the AP is allowed, a response message including the AP information, and to transmit the received AP information to the second device.

12. The system of claim 10, wherein the AP is further configured to receive, from the first device, the request message for requesting the access to the second device, to determine whether the access to the second device is allowed, and to transmit, when it is determined that the access to the second device is allowed, the AP information, to the first device or the second device, through a wireless channel.

13. The system of claim 10, wherein the second device is further configured:
   to transmit, to the first device, device information of the second device;
   when the tagging of the second device is detected and the first device is connected to the AP, to receive the AP information from the AP or the first device through a wireless channel, and to access the AP.

14. The system of claim 10, wherein the request message includes device information of the second device acquired at a time of tagging of the second device, and the AP is further configured to determine whether the access is allowed or not on the basis of the device information of the second device.

15. An apparatus for connecting an Access Point (AP), the apparatus comprising:
   a Wireless Local Area Network (WLAN) module configured to make a connection with the AP;
   a short-range communication module configured to detect tagging of a device; and
   a controller configured to, when the tagging of the device is detected through the short-range communication module, transmit, to the AP, a request message for requesting access to the tagged device, to receive, from the AP, AP information required for an AP connection, and to transmit the received AP information to the tagged device;
   wherein the controller is further configured to identify, when the tagging of the device is detected, the number of tagged devices connected to the AP, to transmit, when the identified number of tagged devices connected to the AP is less than a predetermined number of connectable devices, the request message, and to limit, when the identified number of tagged devices connected to the AP is greater than or equal to the predetermined number of connectable devices, an AP connection of the tagged device.

16. The apparatus of claim 15, wherein, when detecting the tagging of the device is detected while the apparatus is connected to the AP, the controller is further configured to receive device information of the tagged device.

17. The apparatus of claim 15, wherein the controller is further configured to transmit, to the tagged device, a response message including the AP information through a wireless channel.

18. The apparatus of claim 15, wherein the request message includes device information of the tagged device.

* * * * *